INVENTOR.
GEORGE HERBSTER

INVENTOR.
GEORGE HERBSTER
BY John H. Lemond
HIS ATTORNEY

Oct. 29, 1946.   G. HERBSTER   2,410,285
GAS RANGE OVEN
Filed April 18, 1941   3 Sheets-Sheet 3

INVENTOR.
GEORGE HERBSTER
BY John H. Leonard,
HIS ATTORNEY

Patented Oct. 29, 1946

2,410,285

UNITED STATES PATENT OFFICE 2,410,285

GAS RANGE OVEN

George Herbster, Cleveland, Ohio, assignor to John H. Leonard, Cleveland, Ohio, as trustee Application April 18, 1941, Serial No. 389,214

8 Claims. (Cl. 126—39)

This invention relates to a new heating and cooking oven and particularly to a new and improved oven for domestic cooking ranges and the like.

Heretofore in gas cooking range ovens the practice has been to locate a gas burner beneath the floor of the oven and permit the products from the burner to pass upwardly between the oven liners and the side walls and out through the exhaust passage. Ordinarily, the liners are provided with perforations through which steam and other products from the comestibles being cooked in the oven may escape into the flue. In ovens of this character the temperature is not uniform throughout all portions of the oven compartment, nor is the heating of articles being cooked as uniform as desired. Furthermore, products from the burning gas enter the oven and escape into the room, especially when, as is not uncommon, the oven door is opened and the oven lighted for heating and tempering the room in the spring and fall seasons.

One of the principal objects of the present invention is to provide a cooking oven for a gas or oil burning range in which the burner compartment of the oven is entirely separated and out of communication with the cooking compartment, and in which the heat from the burner is more uniformly and effectively distributed throughout the cooking compartment.

Another object is to provide in a cooking range oven a hollow heat exchanger having a combustion chamber and which is exposed in the oven compartment, but of which the interior is uncommunicated from the interior of the oven.

Another object is to provide a blower means which is operable selectively for positively recirculating the air of the oven through the exchanger and oven and for admitting and circulating air from outside of the oven through the exchanger and oven.

Another object is to provide for the heating of the oven in a manner such that the oven and its heat exchanger can be used efficiently for heating and circulating air throughout a room while at the same time constraining the products of combustion from entering the atmosphere of the room.

Another object is to provide a cooking range which is selectively operable for the purposes of cooking and for the purposes of heating the room effectively.

Other objects and advantages will become apparent from the following description wherein reference is made to the drawings, in which Fig. 1 is a front elevation partly in section of a domestic cooking range showing the interior of an oven embodying the principles of the present invention;

Figure 1:
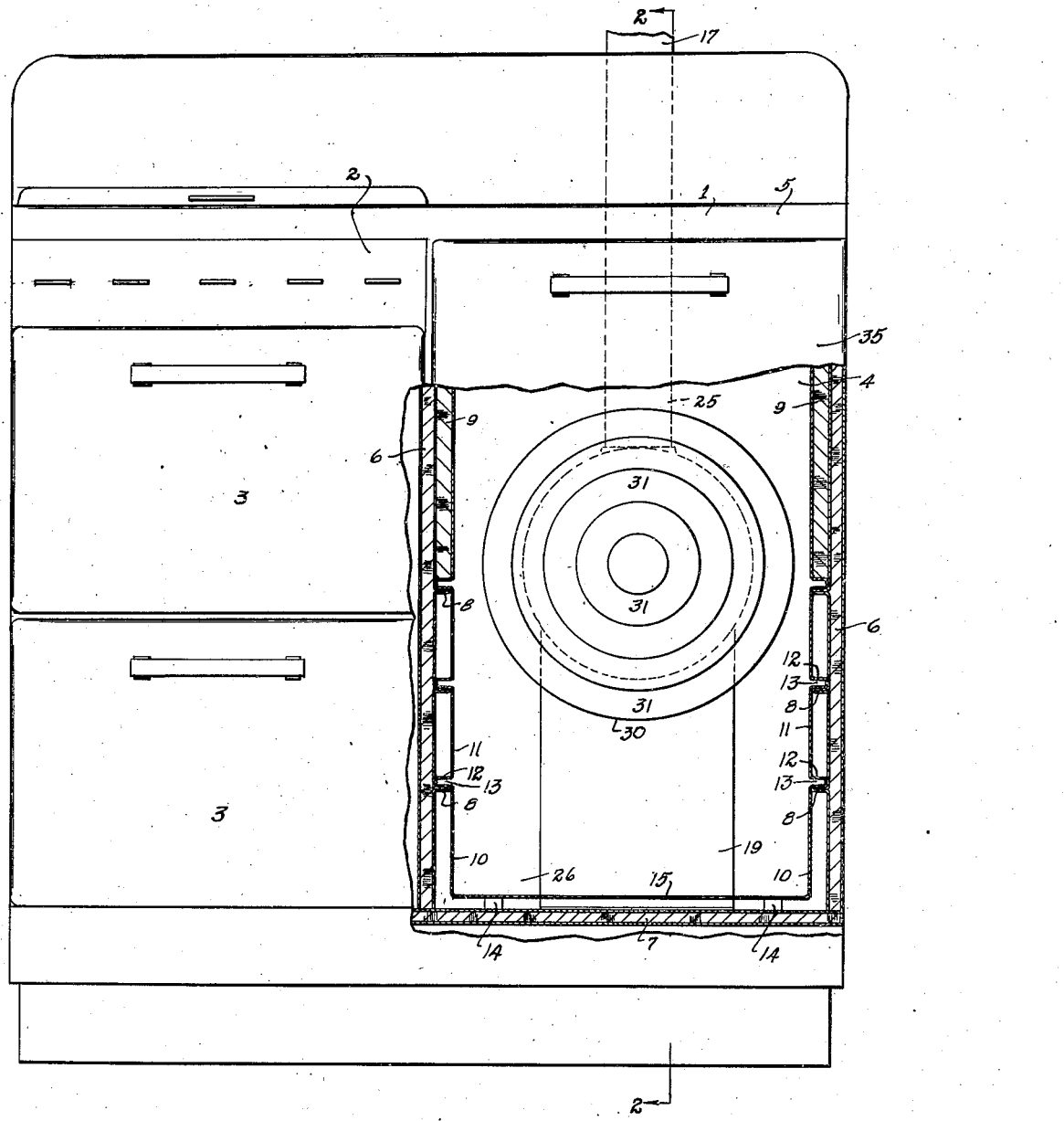

For the purposes of illustration the invention is shown as embodied in a domestic cooking range, designated generally at 1, having the usual top burner compartment 2 and storage cabinets 3 beneath the top burner compartment 2. The oven compartment preferably occupies one half of the range, as indicated generally at 4. Ordinarily, in gas cooking ranges, the oven comprises an upper baking compartment with a burner beneath the floor and a smaller broiling compartment therebeneath, the two occupying substantially half of the range. In the present invention, however, the oven 4 comprises a single compartment in which both baking and broiling and the like are done.

The oven 4 is defined by the usual insulating top wall 5 and side walls 6 but, contrary to the usual practice, the bottom wall 7 also is insulated.

The inner faces of the side walls 6 are provided with horizontal longitudinal sills 8 which may be formed by integral projections or corrugations of the sheet metal which forms the inner faces of the side walls 6. The longitudinal sills 8 are arranged in a vertical series, the bottom sills 8 being located near the floor of the compartment. The sills 8 are spaced apart vertically the usual distance provided for shelves or trays in an oven, the topmost sills, however, being about half way, or slightly more, upwardly from the bottom of the compartment. Above this level the walls of the oven compartment are preferably made of double thickness, as indicated at 9, so as to provide more effective insulation in this locality.

Fitted within the lower part of the oven compartment 4 is a supplemental liner 10 which is preferably formed of imperforate sheet metal. The liner 10 has side walls 11 which are indented longitudinally from the inside so as to provide on the outer surfaces, a number of horizontal lugs 12 which may rest on the longitudinal sills 8, or tray supports, for supporting the liner 10 in place. These indentations also form guideways 13 for receiving and supporting trays inside of the liner 10. Suitable base supports 14 are provided on the bottom wall of the oven compartment for supporting the bottom wall 15 of the liner 10 in spaced relation above the wall 7. The rear wall of the liner 10 is spaced from the rear insulated wall of the oven compartment, as will later be described, and extends transversely of the oven into substantial juxtaposition with the heat exchanger, later to be described.

Figure 2:
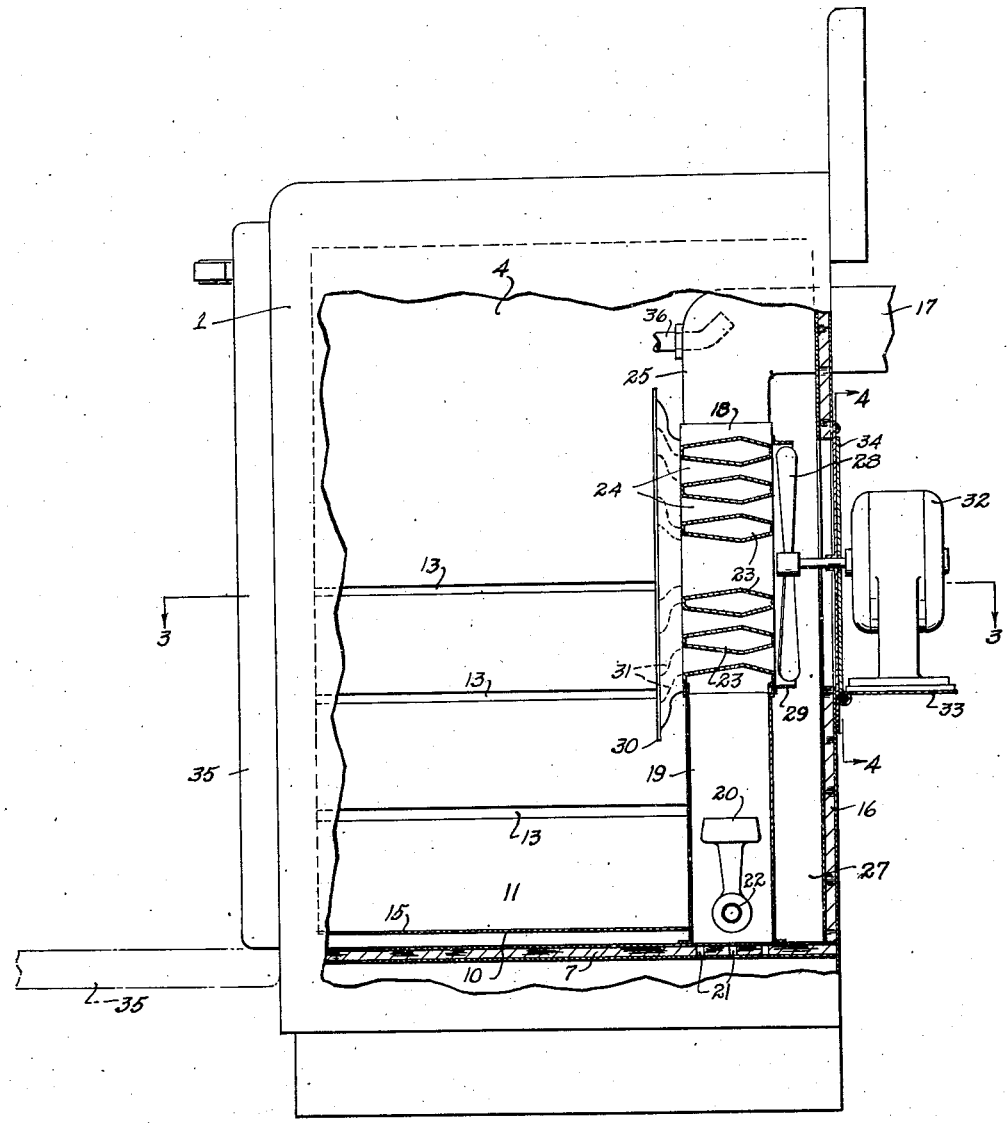
Fig. 2 is a vertical cross sectional view taken on line 2—2 in Fig. 1.
Figure 3:
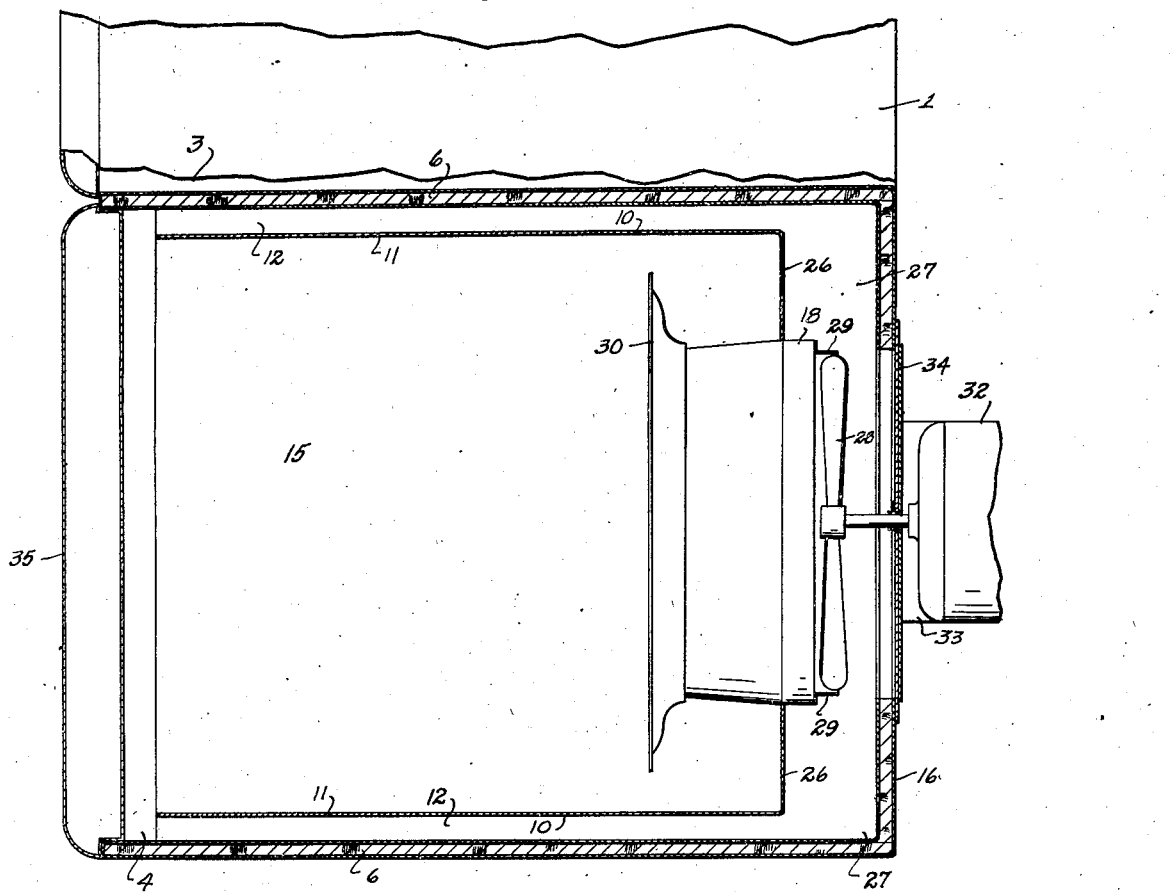
Fig. 3 is a horizontal sectional view taken on the line 3—3 in Fig. 2, part thereof being shown in elevation for clearness in illustration.
Figure 4:
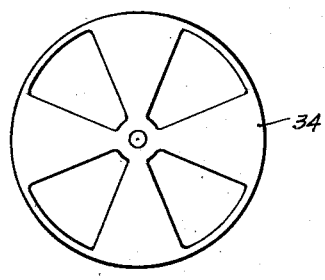
Fig. 4 is a fragmentary view of the rear wall damper as viewed from the line 4—4 in Fig. 2.

Referring to Fig. 2, the oven has the usual rear wall 16 which is preferably insulated and has the usual stack or exhaust outlet duct 17.

Mounted in upright position adjacent to, but spaced forwardly from the rear wall 16, is a heat exchanger which preferably comprises a heat exchange head 18 and an integral combustion chamber 19, in the latter of which a gas burner 20 is accommodated. The chamber 19 rests upon the bottom wall 7 of the oven compartment and openings 21 are provided in the wall 7 for admitting primary air to the burner 20, gas being supplied to the burner through the usual gas pipe 22. The heat exchange head 18 is in superimposed relation to the combustion chamber 19 and preferably comprises a plurality of annular tubes 23 arranged coaxially and in radially spaced relation to each other. The tubes 23 are in communication interiorly with the interior of the chamber 19. Annular spaces 24 between the tubes connect the oven in front of the heat exchanger with the space to the rear thereof. The heat exchanger is connected at its upper end to the flue or stack 17 by an exhaust duct 25.

The side walls 11 and bottom wall 15 of the liner 10, and the rear wall 26 of the liner 10 define, with the walls of the oven, respectively, passages for admission of air from the forepart of the oven near the door rearwardly between the liner 10 and the interior oven walls 6 and 7, and all of these passages communicate with the space 27 to the rear of the heat exchanger.

Arranged in the space 27 in coaxial relation with the tubes 23 is a propeller fan 28, the fan being surrounded by a retaining ring 29 so as to confine the slip stream and draw air effectively from the space 27 and force it through the annular spaces 24 into the oven compartment. Thus air is caused to pass forwardly through the oven and return to the fan between the liner 10 and the oven walls. If desired, a diffusing grill 30, comprising a plurality of concentric vanes 31 which are flared outwardly away from the heat exchanger, may be provided for directing the heated air to the desired parts of the oven.

The fan 28 is driven by a motor 32 which is supported on a hinged bracket 33 so as to swing downwardly and rearwardly, the fan being directly connected to the motor shaft. The bracket 33 is secured on the rear wall of the oven and, in the rear wall 16 in alignment with the fan, is fitted a rotary damper 34. The damper 34 is preferably carried on the hinged bracket 33 so that it and the fan can be dropped to the rear for inspection and also so as to afford access to the rear of the heat exchanger. The damper 34 when rotated to one position admits outside air directly to the fan and through the heat exchanger and, in another position, effectively closes the opening through the rear wall 16. Thus the air can be recirculated in the oven when the oven door 35 is closed simply by closing the damper 34.

If it is desired to use the oven for heating the room, the oven door 35 may be opened and the damper 34 also opened and outside air will be circulated freely through the heat exchanger and diffused by the grill 30 forwardly and radially from the heat exchanger through the open door of the oven and into the room.

In order to exhaust steam and other fumes from the oven compartment when the oven is closed, a small bleeder duct 36 is connected with the flue or duct 25 of the heat exchanger, this duct opening at one end into the interior of the oven in front of the heat exchanger and at the other end into the flue or duct 25.

By the arrangement hereinbefore described, a continuous circulation of the heated air throughout the oven is effected in a manner such that substantially all parts of the oven are raised to the same temperature. The upper portion of the oven normally tends to accumulate heat to a greater extent than the lower, but even though the liner 10 extends only part way toward the top of the oven to a point at which it joins with the inwardly extended side walls, nevertheless, air from the upper part of the oven is forced downwardly from the upper level of the oven into the space between the liner 10 and the oven walls. Since the combustion chamber and heat exchange head are all uncommunicated from the oven compartment, none of the gaseous products from the burner come into contact with the comestibles being cooked. Though the oven depth forwardly and rearwardly of the range is somewhat reduced by the installation, this is more than compensated for by the greater useful space upwardly and downwardly, the usual base burner compartment having been eliminated.

Having thus described my invention, I claim:

1. A domestic cooking range oven having upright walls, a hollow heat exchanger in the oven in spaced relation to one of said walls and uncommunicated interiorly with the interior of the oven, burner means within the exchanger, an exhaust duct leading from the exchanger to the outside of the oven, fan means in the space between the exchanger and the said one of the walls for recirculating air in the oven through the heat exchanger, and a liner spaced from a wall of the oven and defining therewith a passage opening into the said space between the heat exchanger and said one of the walls, and arranged for admitting the air of the oven into said passage at a location remote from said space.

2. A domestic cooking range oven having upright walls, a heat exchanger in the oven in spaced relation to one of said walls, said exchanger being hollow and uncommunicated interiorly with the interior of the oven, burner means for supplying heating media into the exchanger, an exhaust duct leading from the exchanger to the outside of the oven, fan means between the exchanger and the said one of said walls for recirculating air in the oven through the heat exchanger, a liner spaced from a wall of the oven and defining therewith a passage into the space between the heat exchanger and said one of the walls and arranged for admitting air of the oven into said passage at a location remote from said space, one of said oven walls having an opening for admitting outside air into the oven, and a damper for controlling the admission of air through said opening.

3. In combination, a domestic cooking range oven having a cooking space for accommodating containers and food to be cooked and a front door, a heat exchanger in the oven adjacent the rear oven wall which is opposite said door and spaced from the said rear wall in a direction toward the door, said exchanger being hollow and uncommunicated interiorly with the interior of the oven, burner means for supplying heating media to the exchanger, an exhaust duct leading from the exchanger to the outside of the oven, blower means for directing air from the space between the heat exchanger and said rear wall into heat exchange relation with the exchanger, through the cooking space and toward said door, means operative when the door is closed for conducting said air from the cooking space of the oven at a location adjacent the door and admitting said air to the inlet side of the blower means, and means operative when the door is open for admitting outside air into the oven at the inlet side of the blower means, whereby air from outside the oven may be blown into contact with the exchanger and outwardly of the oven through said door.

4. A domestic cooking range oven having insulating walls, a hollow heat exchanger in the oven in spaced relation to one of said walls and uncommunicated interiorly with the interior of the oven, burner means for the exchanger, exhaust means leading from the exchanger to the outside of the oven, a liner in the oven in spaced relation to other walls thereof and defining between the liner and said other walls a passage for air in the oven to the space between the said one of the walls and exchanger, said liner terminating short of the ends of the walls from which it is so spaced to form an entrance passage for admission of air in the oven between the liner and walls, and blower means having its inlet in the space between the exchanger and said one of the walls and arranged to circulate air in heat exchanging relationship to the heater and through the oven.

5. A cooking range oven having enclosing walls and a front door, a heat exchange head having air passages therethrough and being located within and at the rear of the oven with the passages directed for outlet of heated air toward the door, blower means operable to blow air forwardly through said passages, and said blower means having an inlet within the oven operative to enable recirculation of warmed air in the oven.

6. In combination, a domestic cooking range oven having a door, a heating means, a blower means operable for recirculating air through the oven and into heat exchanging relationship to said heating means, and means operable to admit air inside the oven to the inlet side of the blower and means closely adjacent the inlet side of the blower and operable selectively to admit and block passage of air from outside the oven to the inlet side of the blower.

7. The combination with a domestic cooking range oven sealed to exclude outside air and having a door, of a hollow heat exchanger in the oven and uncommunicated interiorly with the interior of the oven, means for supplying heating media into the exchanger, exhaust means leading from the exchanger to the outside of the oven, whereby the oven may be heated while the interior thereof is free from products of combustion, blower means and means operable for rendering the blower means effective to recirculate air which is in the oven and means disposed closer to the inlet side of the blower than is the door and operable selectively to admit and exclude passage of outside air to the blower thereby to control such passage of outside air in relation to the exchanger for introduction into the oven whereby, when the oven door is open, the exchanger can be used for heating space outside of the oven.

8. In combination, a domestic cooking range oven having a door, a hollow heat exchanger exposed to the interior of the oven, the interior of the exchanger being uncommunicated with the interior of the oven, an exhaust duct connected with the exchanger and extending outside of the oven, burner means for supplying heating media into the exchanger, blower means having an inlet communicating with the interior of the oven and being operable for recirculating gaseous media within the oven through the oven and into heat exchanging contact with said exchanger, air inlet means in addition to said door and extending through a wall of the oven and having its discharge opening into the interior of the oven closely adjacent the inlet side of the blower means and operable selectively to admit and block passage of air from the outside of the oven directly to the inlet side of the blower means.

GEORGE HERBSTER.